United States Patent
Li et al.

(10) Patent No.: US 7,450,536 B2
(45) Date of Patent: Nov. 11, 2008

(54) APPARATUS AND METHOD FOR GENERATING AND RECEIVING TRAFFIC IN A BLOCK SPREADING CODE DIVISION MULTIPLE ACCESS MOBILE COMMUNICATION SYSTEM

(75) Inventors: Jianjun Li, Yongin-si (KR); Sung-Jin Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1007 days.

(21) Appl. No.: 10/824,755

(22) Filed: Apr. 14, 2004

(65) Prior Publication Data

US 2004/0252753 A1 Dec. 16, 2004

(30) Foreign Application Priority Data

Apr. 14, 2003 (KR) .................. 10-2003-0023519

(51) Int. Cl.
*H04B 7/212* (2006.01)

(52) U.S. Cl. ..................... 370/321; 370/342

(58) Field of Classification Search ............... 370/320, 370/321, 335, 336, 342, 345–347
See application file for complete search history.

(56) References Cited

U.S. PATENT DOCUMENTS

| | | | | |
|---|---|---|---|---|
| 7,031,295 | B2 * | 4/2006 | Schafer | 370/350 |
| 2001/0026580 | A1 * | 10/2001 | Tamura | 375/147 |
| 2002/0122465 | A1 * | 9/2002 | Agee et al. | 375/141 |
| 2004/0085916 | A1 * | 5/2004 | Nakamura et al. | 370/282 |
| 2004/0109422 | A1 * | 6/2004 | Naito | 370/328 |

* cited by examiner

*Primary Examiner*—Edward Urban
*Assistant Examiner*—Nhan T. Le
(74) *Attorney, Agent, or Firm*—The Farrell Law Firm, PC

(57) ABSTRACT

An apparatus and method for generating and receiving traffic in a code division multiple access mobile communication system using a block spreading scheme. The apparatus and method for generating and receiving traffic sequences in a code division multiple access mobile communication system use a block spreading code, by a simple method, without increasing the complexity of a system, which is capable of improving receipt performance by reducing an MAI at maximum.

3 Claims, 14 Drawing Sheets

APPARATUS AND METHOD FOR GENERATING AND RECEIVING TRAFFIC IN A BLOCK SPREADING CODE DIVISION MULTIPLE ACCESS MOBILE COMMUNICATION SYSTEM

PRIORITY

This application claims priority to an application entitled "APPARATUS AND METHOD FOR GENERATING AND RECEIVING TRAFFIC IN BLOCK SPREADING CODE DIVISION MULTIPLE ACCESS MOBILE COMMUNICATION SYSTEM", filed in the Korean Intellectual Property Office on Apr. 14, 2003 and assigned Serial No. 2003-23519, the contents of which are hereby incorporated by reference.

BACKGROUND OF THE INVENTION

1. Field of the Invention

The present invention relates generally to an apparatus and method for generating and receiving traffic in a code division multiple access mobile communication system, and more particularly to an apparatus and method for generating and receiving traffic in a code division multiple access mobile communication system using a block spreading scheme.

2. Description of the Related Art

Conventionally, a code division multiple access (CDMA) mobile communication system has been well known as a representative example of a wireless communication system. Many methods using the CDMA mobile communication system have been proposed from a DS (Direct Sequence)-CDMA, through many developments, to a BS (Block Spreading) CDMA. A multiple access interference (MAI) is always considered in these methods. The MAI is generated by an inter-signal random time offset in the CDMA mobile communication system where users have different individual codes. The MAI can be ignored if the CDMA mobile communication system has only one user or a few users, but becomes large when the system has many users.

Further, mobile communication systems have gradually developed from systems providing only voice services to systems providing simple data services. For example, a system called 1x E-DO for transmitting high speed packet data is used. In addition, standardization of a 1x E-DV, which is capable of transmitting voice and high speed packet data together, has currently come to the finish.

As the high speed packet data transfer is achieved, the MAI has a significant effect on the data transfer. Accordingly, many studies have been made to reduce the MAI. One of these systems is the DS-CDMA system. FIG. 1 is a block diagram of signals of spread of data to be transmitted in the DS-CDMA system.

Referring to FIG. 1, reference numeral 100 designates a first data of a particular user. Additionally, in FIG. 1, (k) in $s_i^{(k)}$ is a k-th user and i is i-th data. In addition, (k) in $c_p^{(k)}$ is a k-th user and p is i-th spread code. Reference numerals 101, 102, 103, 110, 111 and 113 identify data resulting from spreading each data symbol by a particular spread code. The spread data is transmitted from a base station to a mobile terminal via a multi-path during forward transmission and is transmitted from the mobile terminal to the base station via the multi-path during reverse transmission.

FIG. 2 is a timing diagram illustrating the transmission of the spread data via the multi-path. It is assumed in FIG. 2 that a delay is generated during the transmission of data via a forward link. Also, it is assumed that start times of transmission of data to be transmitted to different users are synchronized. A spread data stream 210 is a data stream received via a straight line of a first user. The same data as illustrated in FIG. 1 is received at a start time designated by the reference numeral 200. A data stream 220 is the same data stream as the data stream illustrated in FIG. 1, but has one chip delay and is received via a path other than the straight path. Also, a data stream 230 is the same data as the data stream received via the straight path, but has a two chip delay and is also received via a path other than the straight path.

Data stream 240 is received via a straight path of a different user. Data streams received via the same path are data streams spread by different orthogonal spreading codes. Therefore, for example, when a chip 211 and a chip 241, which are simultaneously received in a receiver, i.e., the mobile terminal, via the same path, are despread in the receiver, the chip 241 is removed by its orthogonality with the chip 211. However, a first chip 221 of the data stream 220 having a delay of one chip interferes with a second chip 242 of the data stream 240 from the different user because the delayed chip 221 has a low probability of maintaining orthogonality with the second chip, which results in deterioration of quality of the received signal. The same is true to the relation between chip 231 of the data stream 230 and chip 243 of the data stream 240.

Although the receiver can decode delayed and spread data streams received through respective fingers via multiple paths, it is possible that an interference of a data stream of a user with a different data stream of a different user may occur. Although one path of the different user is illustrated in FIG. 2, there may be other paths of the different users to cause interference. Therefore, the greater the number of users and paths is, the greater the interference is.

FIG. 3 illustrates interference simulation results when the number of users (K>=1) and the numbers of paths are 1, 3, and 5. In FIG. 3, reference numeral 301 designates a band of a signal-to-noise ratio required for voice traffic and reference numeral 302 designates a band of a signal-to-noise ratio required for data traffic. In addition, reference numeral 310 designates a simulation result for the signal-to-noise ratio and a bit error rate (BER) in one path, i.e., a straight path, reference numeral 320 designates a simulation result for the signal-to-noise ratio and the BER in three paths, and reference numeral 330 designates a simulation result for the signal-to-noise ratio and the BER in five paths. As can be seen in FIG. 3, when three and five paths are used, the BER converges in a band of 1.00E-02. In other words, as the number of paths increases, it becomes difficult to improve the BER.

The BS-CDMA system has been proposed to overcome the problem occurring when the DS-CDMA system is used. FIG. 4 is a diagram illustrating a spread data stream received by a particular user in the mobile communication system using the BS-CDMA system.

Referring FIG. 4, each of reference numerals 410, 420 and 430 represents a spread of a plurality of data streams by one spreading code. Chip 1 410, chip 2 420, and chip p 430 each consist of, for example, 100 symbols. Data symbols included in the same chip are spread by the same spreading code. User symbols $S_1^{(k)}, S_2^{(k)}, \ldots, S_M^{(k)}$ included in chip 1 410 are spread by a spreading code $c_1^{(k)}$. User symbols $S_1^{(k)}, S_2^{(k)}, \ldots, S_M^{(k)}$ included in chip 2 420 to be transmitted next are spread by a next spreading code $c_2^{(k)}$. Therefore, in the BS-CDMA system, spreading codes are changed in a certain unit, which enables the MAI by the multiple paths to be reduced.

FIG. 5 is a timing diagram of spread data streams of two users received via multiple paths in the BS-CDMA system. Herein below, a procedure of receiving data streams of two users via the multiple paths and a resultant MAI in the BS-CDMA system will be described in detail with reference to FIG. 5.

Referring FIG. 5, reference numerals 510, 520, and 530 indicate spread data streams of a first user received via respective different paths. Chip 1, chip 2, and chip p in the data stream 510 are intended to represent chip units. The spread data streams are received in the chip units, as illustrated in FIG. 4. It is assumed in FIG. 5 that a delay is generated in one symbol unit. When the delay is generated in one symbol unit, the data stream 510 is received with the delay, as shown by data streams 520 and 530.

However, assuming that spread data streams of a different user are received via the same path in synchronization with the data streams of the first user, the data stream 540 of the different user is received via the same path as the data stream 510. In addition, the data stream 550 of the different user is received via the same path as the data stream 520 and the data stream 560 of the different user is received via the same path as the data stream 530. In such a receipt, there are intervals 501, 502, …, 503, as illustrated in FIG. 5, where interference due to a delay difference between the data streams of the first user and the data stream of the different user occurs. In these intervals, because there is no data interference, the data streams can be more precisely received without considering the interference by the MAI.

Data streams to be transmitted from the base station to the user are segmented into predetermined blocks. Symbols in each of the blocks are spread by a code allocated for each block. Accordingly, a signal to be transmitted to a k-th user is expressed as in Equation 1, $$X_k(t) = \sum_{j=1}^{M} s_j^{(k)} \sum_{i=1}^{P} c_i^{(k)} g(t - iMT_s - jT_s) \quad \text{Equation 1}$$

where k is the index of each user, $s_j^{(k)}$ is a transmit symbol at jth timer, and $c_i^{(k)}$ is ith bit of the spreading sequence.

In Equation 1, g(u) is determined by Equation 2.

$$g(u) = \begin{cases} 1 & 0 \leq u < T_s \\ 0 & u < 0, u \geq T_s \end{cases} \quad \text{Equation 2}$$

In Equation 2, $T_s$ indicates a duration during which one symbol in one chip exists in a slot. Equation 1 is well known as an equation for data streams as shown in FIG. 4 in the case of the DS-CDMA system, and therefore, a detailed explanation thereof will be omitted for the purpose of brevity.

However, normalized orthogonal codes such as Walsh codes are codes used for different users. Therefore, even if the base station transmits traffic data to a plurality of users, traffic sequences received by a particular user are deleted by the orthogonal Walsh codes, as shown in Equation 3.

$$\sum_{i=1}^{P} c_i^k c_i^{k'} = \begin{cases} 1 & k = k' \\ 0 & k \neq k' \end{cases} \quad \text{Equation 3}$$

In Equation 3, k represents a particular user using a particular Walsh code. Therefore, a plurality of user signals transmitted from the base station can be expressed as in Equation 4.

$$S(t) = \sum_{k=1}^{K} X_k(t) = \sum_{k=1}^{K} \sum_{j=1}^{M} s_j^{(k)} \sum_{i=1}^{P} c_i^{(k)} g(t - iMT_s - jT_s) \quad \text{Equation 4}$$

In Equation 4, it should be assumed that the number (k) of users is smaller than the number (P) of paths.

In addition, assuming that a channel of the forward link is a frequency selection channel with the maximum delay time $LT_s$, a receipt signal of a particular k-th user can be expressed as in Equation 5.

$$r(t) = \sum_{l=0}^{L-1} h_l \sum_{k=1}^{K} \sum_{j=1}^{M} s_j^{(k)} \sum_{i=1}^{P} c_i^{(k)} g(t - iMT_s - lT_s) + n(t) \quad \text{Equation 5}$$

In Equation 5, $h_l$ indicates a complicated fading factor of an l-th delay path and n(t) is additive white Gaussian noise (AWGN). When designing a receiver, in Equation 5, M should be larger than L. M is the number of gap symbols in a frame and L is the index of each multipath signal.

Accordingly, a receiver (i.e., the mobile terminal) receiving the data streams performs a despread process for data detection. This despread process is performed according to the above Equation 5. Accordingly, an output of the despreading for a j-th symbol time slot in one block can be expressed as in Equation 6.

$$y_j^{(k')} = \sum_{i=1}^{P} c_i^{(k')} r(i'MT_s + j'T_s) \quad \text{Equation 6}$$

$$= \sum_{l=0}^{L-1} h_l \sum_{k=1}^{K} \sum_{j=1}^{M} s_j^{(k)} \sum_{i'=1}^{P} \sum_{i=1}^{P} c_i^{(k)} c_{i'}^{(k')} g(i'MT_s - iMT_s + j'T_s - jT_s - lT_s) + \sum_{i'=1}^{P} c_{i'}^{(k')} n(i'MT_s + j'T_s)$$

In addition to the definition on the line for equation 1, $h_l$ is the impulse response of lth multipath.

Then, by substituting Equation 3 into Equation 6, despread outputs of an M-th symbol to an L-th symbol can be expressed as the following Equation 7.

$$y_j^{(k')} = \sum_{l=0}^{L-1} h_l s_{j-l}^{(k')} + \sum_{i'=1}^{P} c_{i'}^{(k')} n(i'MT_s + j'T_s) \quad \text{Equation 7}$$

where, j = L, …, M

As can be seen from the above Equation 7, the MAI for first L−1 symbols is still present as ISI (Inter Symbol Interference), which has an effect on detection of M−L+1 symbols. This can be verified from FIG. 5. Namely, there is interference due to the MAI between front symbols and rear symbols in an interval between the reference numeral 501 and the reference numeral 502.

However, as described above in connection with FIG. 5, the interval where the MAI is not generated is not a continuous interval. Therefore, there is an interval where interference occurs. Accordingly, a receiver should be configured such that it processes an interval with the interference and an interval without the interference separately. However, in this case, the receiver may become complex. Accordingly, methods have been suggested to overcome this complexity problem at the time of transmission of data streams. These methods will be hereinafter considered.

FIG. 6A is a diagram illustrating a method for constructing a data stream in order to reduce interference caused by the MAI in the BS-CDMA system, and FIG. 6B is a diagram illustrating another method for constructing a data stream in order to reduce interference caused by the MAI in the BS-CDMA system.

Referring to FIG. 6A when a data stream of the BS-CDMA system is constructed using a cyclic structure, symbols in which the MAI may occur, in a last part of a traffic to be transmitted, are copied, and the copied symbols are transmitted in advance. More specifically, symbols 601 are copied, and the copied symbols are attached ahead of symbol data 602 to be transmitted together. The method illustrated in FIG. 6A enables more efficient reproduction of data at a data receipt side.

Referring to FIG. 6B when the data stream is constructed by using a zero-padding as a non-cyclic structure, the predetermined number of "0"s are inserted into the data stream to be transmitted in order to reduce interference of a last part in the data stream. More specifically, the predetermined number of "0"s are inserted into the data stream during a predetermined interval designated by the reference numeral 603, which results in ease of data transmission as well as performance improvement of the receiver.

However, the methods of FIGS. 6A and 6B have a number of problems. In the method illustrated in FIG. 6A, because symbols are copied and displaced beforehand, combination of symbols should be carried out with displaced symbols and non-displaced symbols separated. In addition, because the MAI of the displaced symbols has an effect on front and rear symbols in the data stream, identical symbols should be simultaneously processed in order to increase the efficiency of reduction of interference between symbols. This increases the complexity of the circuits of the receiver.

In the method illustrated in FIG. 6B, the insertion of "0"s into the end of the data stream causes a problem of deterioration of bandwidth efficiency of a system. In addition, it is difficult for the system to transmit symbols "0"s. Consequently, the complexity of the system may be increased.

SUMMARY OF THE INVENTION

Therefore, the present invention has been designed in view of the above and other problems, and it is an object of the present invention to provide an apparatus and method for generating and receiving traffic sequences in a code division multiple access mobile communication system using a block spreading code, by a simple method.

It is another object of the present invention to provide an apparatus and method for generating and receiving traffic sequences in a code division multiple access mobile communication system using a block spreading code, without increasing the complexity of a system.

It is still another object of the present invention to provide an apparatus and method capable of improving receipt performance by reducing an MAI in a code division multiple access mobile communication system using a block spreading code.

In accordance with an aspect of the present invention, the above and other objects can be accomplished by a traffic generating apparatus in a block spreading code division multiple access mobile communication system, comprising: a chip spreading unit for spreading the predetermined number of symbols by one spreading code; and a symbol generating unit for generating forward guard symbols by repeatedly copying a first symbol of the spread symbols by the number of times to make reduction of interference due to multiple paths possible, generating backward guard symbols by repeatedly copying a plurality of rear symbols of the spread symbols in a mirror manner, starting from a last symbol of the spread symbols, by the number of times to make reduction of interference due to multiple paths possible, and outputting the generated forward and backward guard symbols.

Preferably, the symbol generating unit comprises a latch circuit for latching and outputting a first symbol input from the chip spreading unit during a predetermined period of time; a delay circuit for delaying and outputting symbols input from the chip spreading unit by a period of time of output of the latch circuit; a buffer for receiving and storing the predetermined number of symbols, starting from a last symbol of the symbols input from the chip spreading unit, and outputting the stored symbols in a last in first out (LIFO) manner; and a multiplexer for generating the first symbol output from the latch circuit as the forward guard symbol, outputting the output of the delay circuit, and outputting the symbols output from the buffer as the backward guard symbols.

In accordance with another aspect of the present invention, there is provided a method for generating traffic in a block spreading code division multiple access mobile communication system, the method comprising the steps of: spreading the predetermined number of symbols by one spreading code; generating and outputting forward guard symbols by repeatedly copying a first symbol of the spread symbols by the number of times to make reduction of interference due to multiple paths possible; outputting the spread symbols successively after the output of the forward guard symbols; and generating backward guard symbols by repeatedly copying a plurality of rear symbols of the spread symbols in a mirror manner, starting from a last symbol of the spread symbols, by the number of times to make reduction of interference due to multiple paths possible, and outputting the generated backward guard symbols successively after the output of the spread symbols.

In accordance with still another aspect of the present invention, there is provided a traffic receiving apparatus in a block spreading code division multiple access mobile communication system, comprising: a maximum ratio combination detector for detecting receipt symbols through a maximum ratio combination of input symbols and symbols output from a decision unit; and an adder for adding symbols the input symbols and symbols output from a feedback filter, wherein the decision unit decides outputs of the adder and inputs the decided outputs to the maximum ratio combination detector and the feedback filter, and wherein the feedback filter filters outputs of the decision unit and outputs the filtered outputs to the adder.

Preferably, the traffic receiving apparatus further comprises a switch for selectively switching the outputs of the decision unit and outputs of the maximum ratio combination detector and inputting the switched outputs to the feedback filter. More preferably, the switch is connected to the decision unit when an input symbol is a first symbol, and is connected to the maximum ratio combination detector for symbols after the first symbol.

In accordance with still another aspect of the present invention, there is provided a method for receiving traffic in a block spreading code division multiple access mobile communication system, the method comprising the steps of: detecting receipt symbols through a maximum ratio combination of first input symbols; performing a decision for the first input symbols, feeding back the decided symbols, and repeatedly adding the feedback symbols to symbols input after the first input symbols; and detecting receipt symbols through a maximum ratio combination of symbols after the first input symbols and the symbols added through the feedback.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
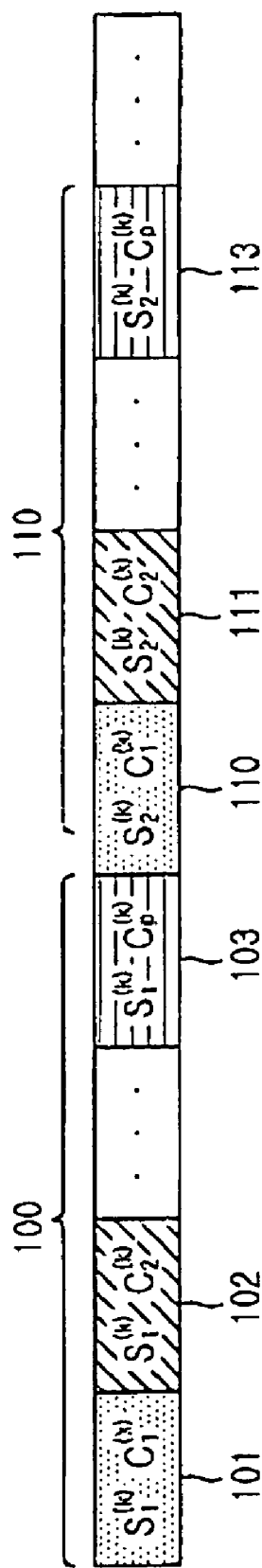
FIG. 1 is a block diagram illustrating spreading data to be transmitted in the DS-CDMA system.
Figure 2:
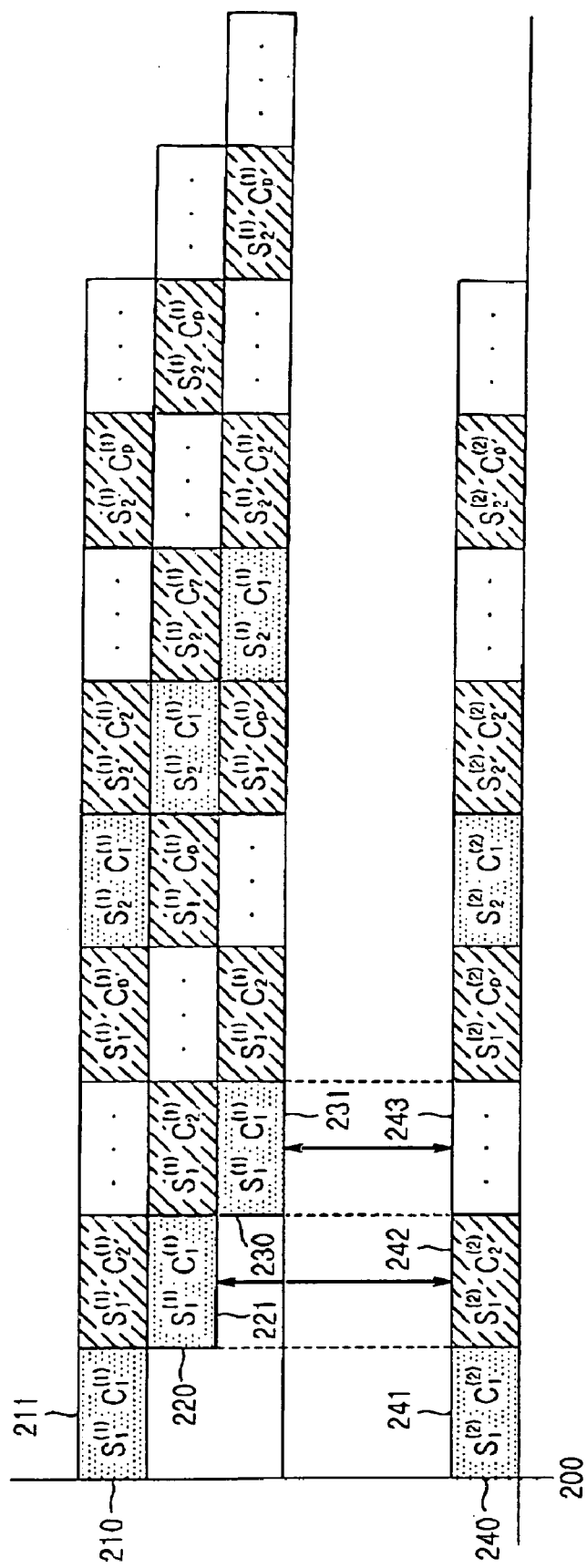
FIG. 2 is a timing diagram illustrating the transmission of the spread data via the multi-path.
Figure 3:
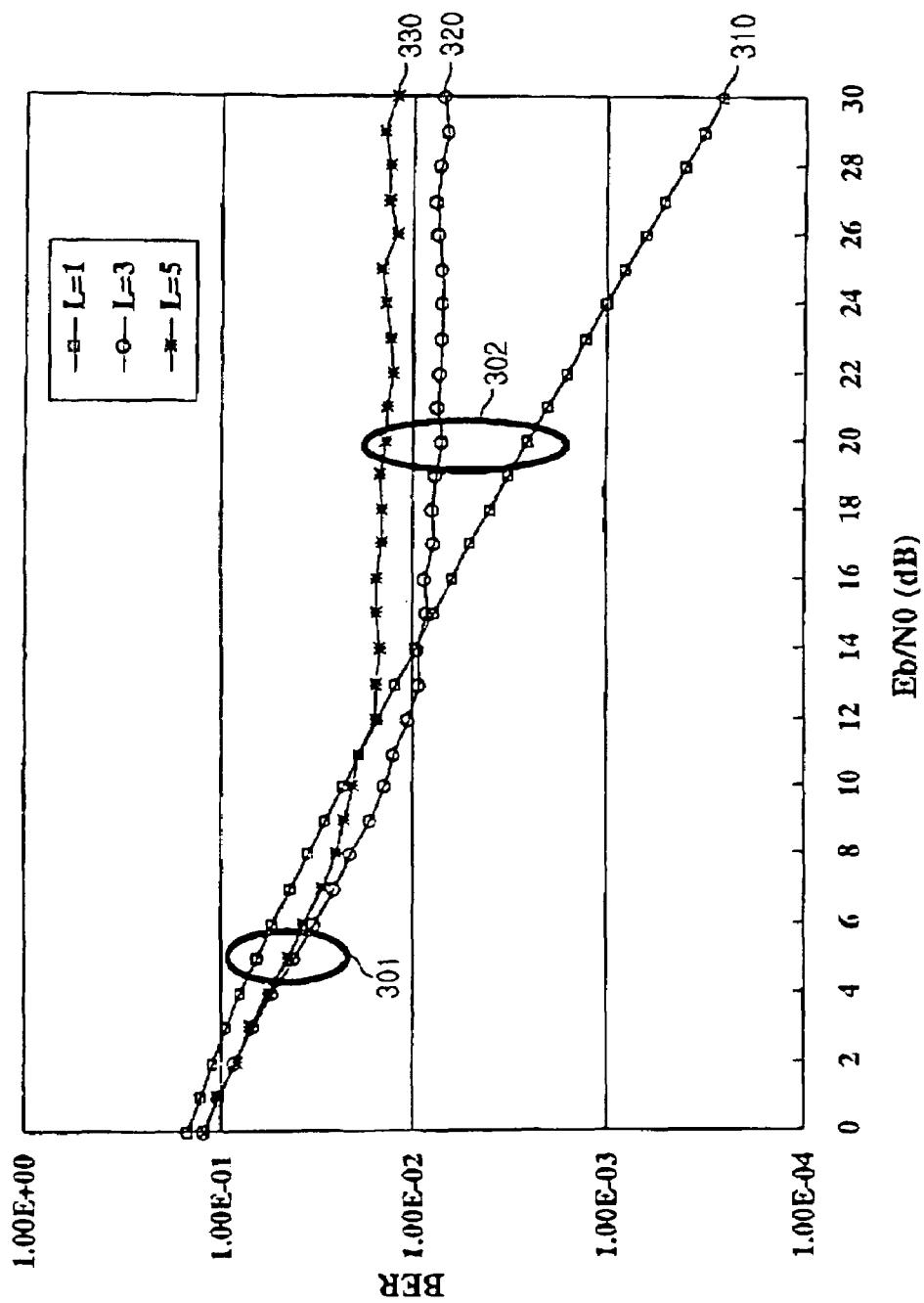
FIG. 3 is a graph illustrating a result of a simulation where the number of users (K>=1) and the number of paths is 1, 3 and 5.

Preferred embodiments of the present invention will be described in detail herein below with reference to the annexed drawings. In the drawings, the same or similar elements are denoted by the same reference numerals even though they are depicted in different drawings.

In the following description of the preferred embodiments of the present invention, a variety of specific terms such as concrete messages or signals are used. The description of such terms has been made only for a better understanding of the present invention. Those skilled in the art will appreciate that the present invention can be implemented without using the above-mentioned specific terms. In the following description, a detailed description of known functions and configurations incorporated herein will be omitted when it may make the subject matter of the present invention rather unclear.

Figure 7:
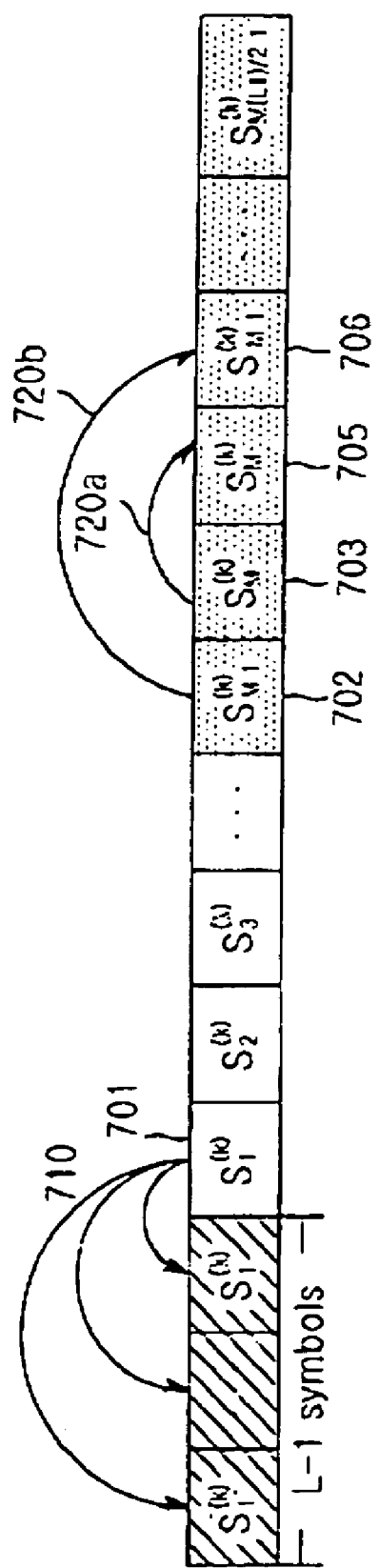
FIG. 7 is a diagram illustrating a spread data stream in accordance with a preferred embodiment of the present invention.

FIG. 7 is a diagram illustrating a spread data stream in accordance with a preferred embodiment of the present invention. In FIG. 7, symbols between reference numerals 701 and 703 comprise one chip in the data stream. The symbols in the one chip are spread by the same spreading code. More specifically, the symbols become a data stream spread according to the BS-CDMA system. When the spread data stream is transmitted as it is, as before, interference caused by the MAI occurs in front symbols and rear symbols. In the present invention, a first symbol 701 is repeatedly transmitted beforehand by a predetermined number, for example, L−1, in order to prevent interference due to multiple paths. This enables the interference of the first symbol to be prevented.

In addition, in order to reduce MAI interference in a last portion of the data stream, symbols are repeatedly transmitted in a reverse order at the end of the actual data stream, starting from the last symbol. More specifically, the last symbol 703 of the actual data stream is copied and inserted in a location next to the last symbol 703, i.e., 705. Also, a symbol 702 immediately before the last symbol 703 is copied and inserted in a location next to the inserted symbol 706. In this way, by inserting symbols in the data stream in such a mirror manner as shown by arrows 720a and 720b, the data stream with reduced MAI interference of symbols in the last portion of the data stream can be transmitted. Namely, guard symbols are inserted before and after the actual data stream. The guard symbols are symbols extracted from a particular portion of the data stream.

In the following description, a symbol copied from the first symbol of the actual data stream and inserted before the actual data stream are called a "forward guard symbol", and symbols copied in a reverse order from symbols previous to the last symbol in the actual data stream, starting from the last symbol, and inserted in such a mirror manner as shown by arrows 720a and 720b are called "backward guard symbols".

When symbols are formed according to the method illustrated in FIG. 7, forward guard symbols are inserted before the first symbol of the actual data stream at the time of transmitting the actual data stream. Because the forward guard symbols are symbols to be first transmitted, of the actual data stream, it is easy to obtain the first symbol of the actual data stream in a depreading process of the receiver. In addition, because symbols included in a rear portion of the actual data stream are inserted after the actual data stream in the mirror manner, data loss due to the interference between symbols can be prevented. further, because the data stream can be detected by using the symbols again in the de-spreading process, such a re-use of the symbols is more efficient, as compared to the conventional insertion of symbols of "0"s after the actual data stream. Additionally, by using the existing data stream, the system complexity can be reduced as compared to a system where symbols of "0"s are to be inserted and the system performance can be improved.

The number of symbols in the data stream illustrated in FIG. 7 can be expressed as Equation 8.

$$\text{Block Length} = \begin{cases} L-1+M+(L-1)/2 & L \text{ is odd} \\ L-1+M+L/2 & L \text{ is even} \end{cases} \quad \text{Equation 8}$$

In Equation 8, (L−2)/2 or L/2 indicating the last symbol in the data stream depends on the number of symbols inserted in the mirror manner. By constructing the data stream as Equation 8, all effective symbols of the data stream have the same energy in respect of data blocks, or a leakage of energy can occur in respect to last L−1 effective symbols. This enables effective symbols with different locations to avoid having different bit error rates.

Figure 8:
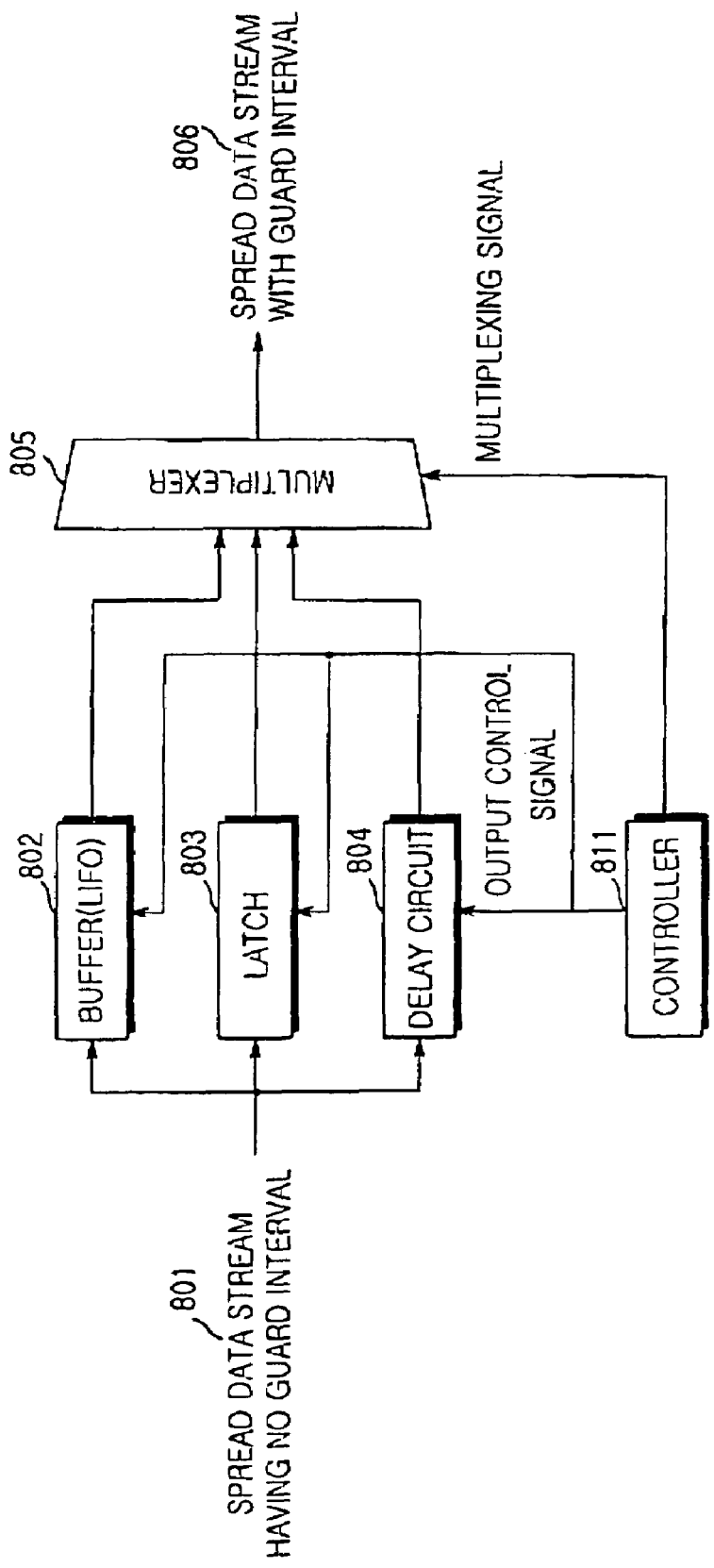
FIG. 8 is a block diagram illustrating a transmission unit for generating a spread data stream in accordance with a preferred embodiment of the present invention.

FIG. 8 is a block diagram of a transmission unit for generating a spread data stream in accordance with a preferred embodiment of the present invention. More specifically, FIG. 8 illustrates the structure and operation of the transmission unit for generating the spread data stream illustrated in FIG. 7.

Referring to FIG. 8, a spread data stream 801 having no guard interval represents the symbols from symbol 701 to symbol 703 in FIG. 7. The spread data stream 801 having no guard interval is generated in a chip spreading unit (not shown in FIG. 8). The chip spreading unit generally is a unit for spreading data streams in a block spreading process. Symbols included in the spread data stream 801 having no guard interval are input to a buffer 802 having a last in first out (LIFO) structure, a latch 803, and a delay circuit 804. The latch 803 receives only a first-input symbol and continuously outputs the first-input symbol during a predetermined period of time in order to generate L−1 symbols as illustrated in FIG. 7. The delay circuit 804 delays the symbols of the spread data stream 801 having no guard interval by a predetermined period of time corresponding to L−1 symbols, for example. In addition, the buffer 802 stores the input spread data stream 801 and then outputs each of the symbols during a predetermined period of time. At this time, the symbols output from the buffer 802 have undergone the operation as shown by the arrows 720a and 720b in FIG. 7.

The symbols output from the latch 803, the delay circuit 804, and the buffer 802 are input to a multiplexer 805. The multiplexer 805 controls an output of each input symbol based on a multiplexing signal. More specifically, the multiplexer 805 multiplexes symbols to output the symbols as illustrated in FIG. 7. Alternatively, the multiplexer 805 can be replaced with a 3 step switch. In this case, a signal output from a controller 811 to the multiplexer 805 will be a switching control signal.

The controller 811 controls the buffer 802, the latch 803, and the delay circuit 804 to receive and store the input spread data stream 801 and controls such that the data streams as illustrated in FIG. 7 are output. More specifically, the controller 811 applies an output control signal to the buffer 802, the latch 803, and the delay circuit 804, and determines a point of time to output the symbols. In addition, the controller 805 controls the multiplexer 805 to multiplex the input symbols so that the data stream illustrated FIG. 7 is constructed.

In the spread data stream in accordance with the present invention as illustrated in FIG. 7, the interference between symbols is cancelled through a simple process. Now, such a process of canceling the interference will be described with reference to FIG. 9.

Figure 9:
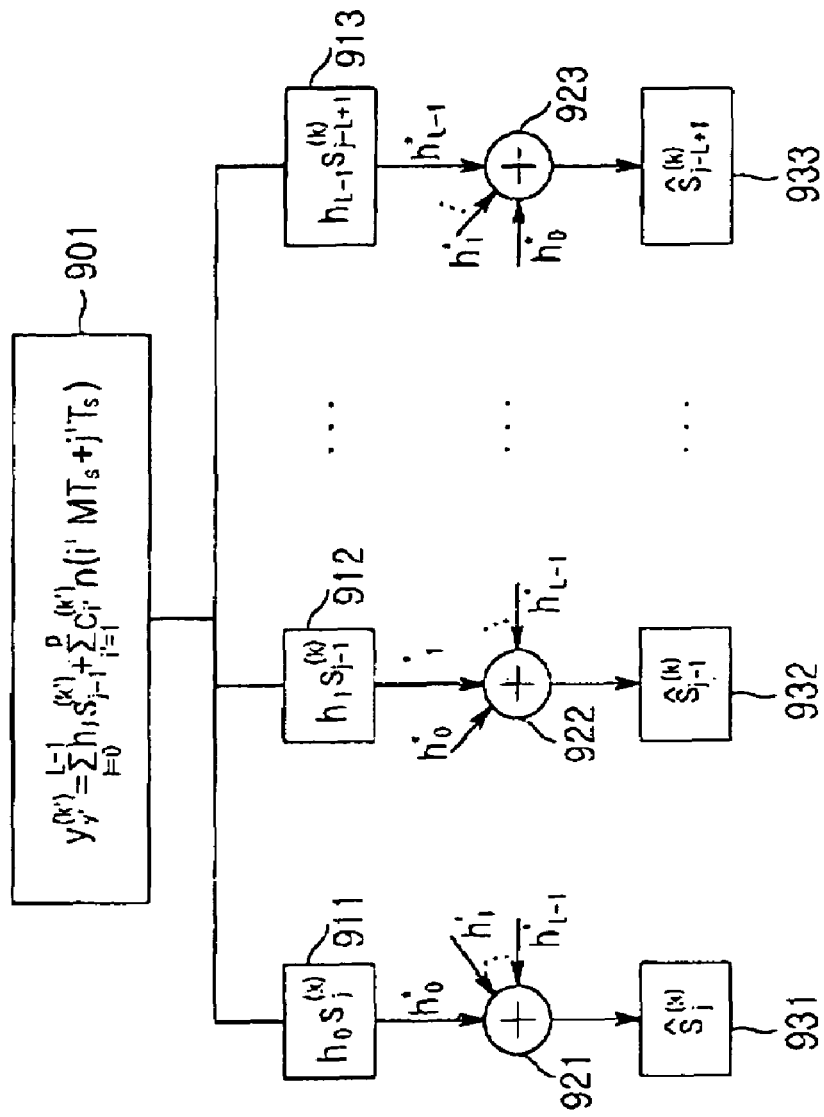
FIG. 9 is a block diagram illustrating a method for detecting a maximum ratio combination of a received spread data stream in accordance with a preferred embodiment of the present invention.

FIG. 9 is a block diagram illustrating a method for detecting a maximum ratio combination of a received spread data stream in accordance with a preferred embodiment of the present invention. In FIG. 9, a reference numeral 901 indicates an equation of a j-th data stream input to a receiver of a k-th user. In an initialization process of the spread data stream, when i=1, a de-spread symbol of a first received symbol can be expressed as the following Equation 9.

$$\hat{s}_1^{(k)} = y_1^{(k)} \sum_{l=0}^{L-1} h_l^* \quad \text{Equation 9}$$

When i=2, a de-spread symbol of a second received symbol can expressed as the following Equation 10, $$\hat{s}_2^{(k)} = h_0^* \left( y_2^{(k)} - \sum_{l=1}^{L-1} h_l Q(\hat{s}_1^{(k)}) \right) \quad \text{Equation 10}$$

where Q( ) is the decision function, which converts the float point signal to the signal having the quantized level same as the transmitted symbols.

In this way, a de-spread symbol of a j-th received symbol can be expressed as the following Equation 11.

$$\hat{s}_j^{(k)} = h_0^* \left( y_j^{(k)} - \sum_{l=1}^{L-1} h_l Q(\hat{s}_{j-l}^{(k)}) \right) \quad \text{Equation 11}$$

In Equation 11, j represents L, L+1, ..., M. In addition, in the above Equations 9 to 11, (˙)* represents a conjugated complex number, and Q(˙) is an equalization operation appropriate for a used arrangement. From the above Equations 9 to 11, it can be seen that determination for one symbol is made by some of symbol energy, i.e., one finger as a first branch of a channel. A Rake receiver of the DS-CDMA system is generally used to combine signals received from different paths in order to use multi-path diversity. If the SNR is high, the Rake receiver of the DS-CDMA system has little gain in a wide-band transmission. However, using the present invention with a low MAI, the Rake receiver can obtain high gain by utilizing the multi-path diversity.

In FIG. 9, the reference numerals 911, 912, ..., 913 indicate values for symbols obtainable by one finger. The values for symbols obtainable by one finger are added to values for symbols obtainable by other fingers in adders 921, 922, ..., 923. Values input to the adders are value of symbols of the same location obtained via different paths. As a result, because symbols without interference from MAI are added in the adders, high gain of the receiver can be obtained by the multiple path diversity. Symbols 931, 932, ..., 933 in FIG. 9 are symbols obtained as outputs of the adders. Here, a detection algorithm should be considered. This detection algorithm combines energy of all symbols dispersed in different outputs of de-spreading, based on a maximum ratio basis. The detection algorithm performs linear combination of energy of symbols through an encoding and symbol canceling process in order to obtain estimate values for data information of users for each symbol.

The detection algorithm for each of symbols obtained as outputs of the adders can be expressed as in Equation 12.

$$\hat{s}_1^{(k)} = y_1^{(k)} \sum_{l=0}^{L-1} h_l^*$$ Equation 12

------

$$\hat{s}_j^{(k)} = h_0^* \left( y_j^{(k)} - \sum_{l=1}^{L-1} h_l Q(\hat{s}_{j-l}^{(k)}) \right)$$

$$m = L - 1,$$

$$\bar{y}_m = y_j^{(k)}$$

Recursion when m>0

$$\hat{s}_{j-m}^{(k)} = \hat{s}_{j-m}^{(k)} + h_m^* \left( \bar{y}_m - \sum_{l=0}^{m-1} h_l Q(\hat{s}_{j-1}^{(k)}) \right)$$

m=m−1

$\bar{y}_m = \bar{y}_m - h_m Q(\hat{s}_{j-m}^{(k)})$ $\bar{y}_m = y_j^{(k)}$

For m=0

$\bar{s}_j^k = h_0^* \bar{y}_0$

Figure 4:
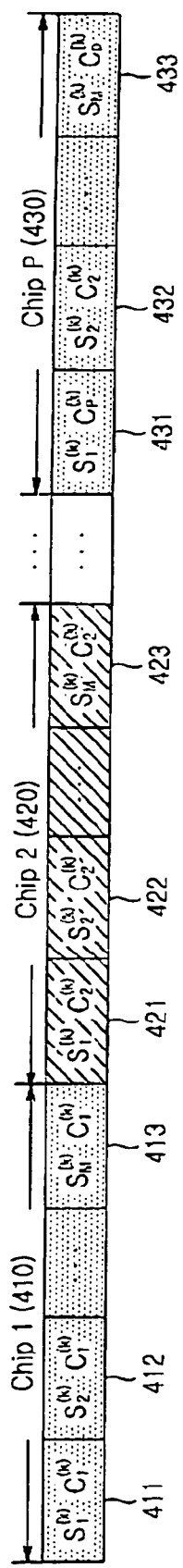
FIG. 4 is a diagram illustrating a spread data stream received by a particular user in the mobile communication system using the BS-CDMA system.
Figure 5:
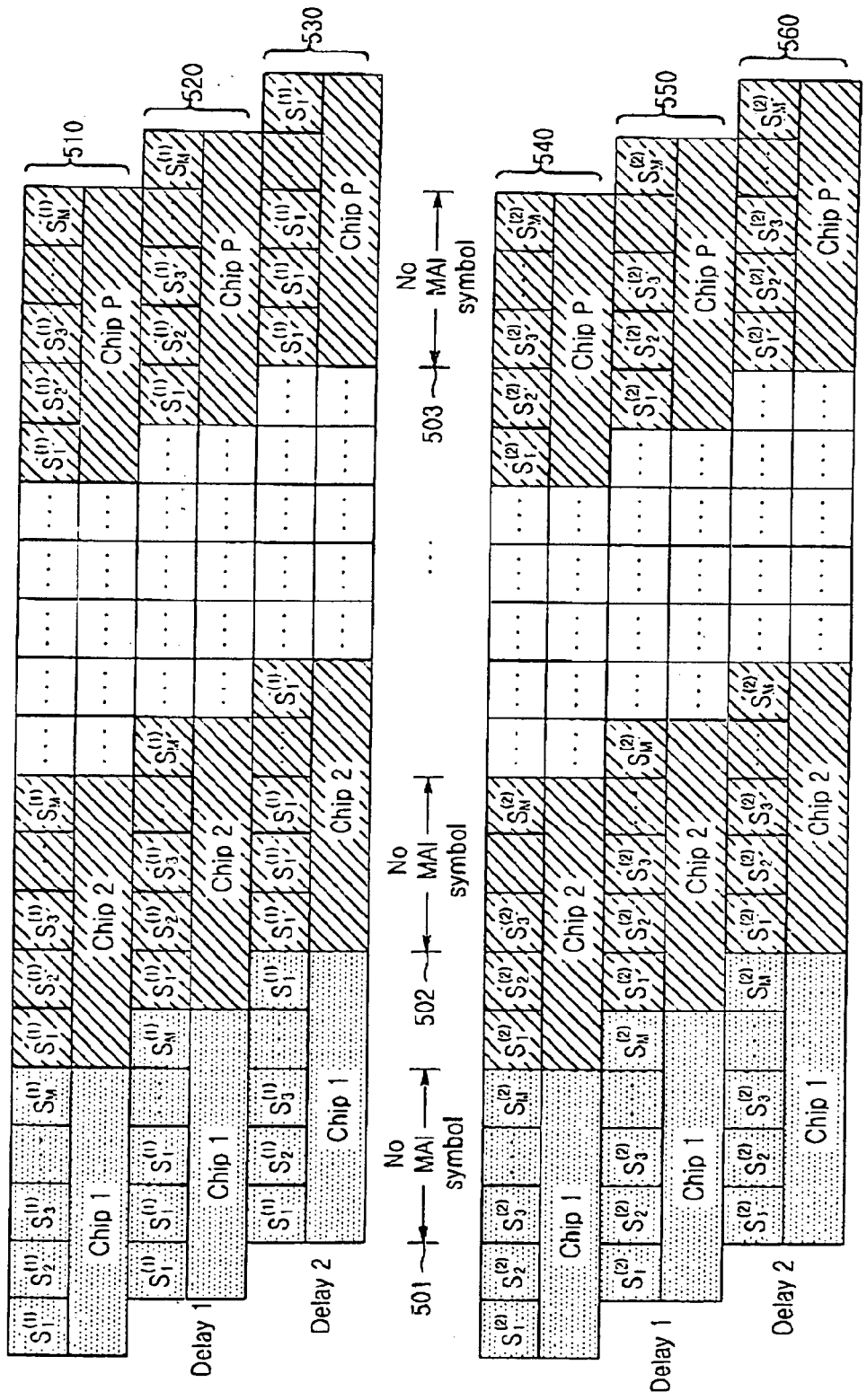
FIG. 5 is a timing diagram of spread data streams of two users received via multiple paths in the BS-CDMA system.
Figure 10:
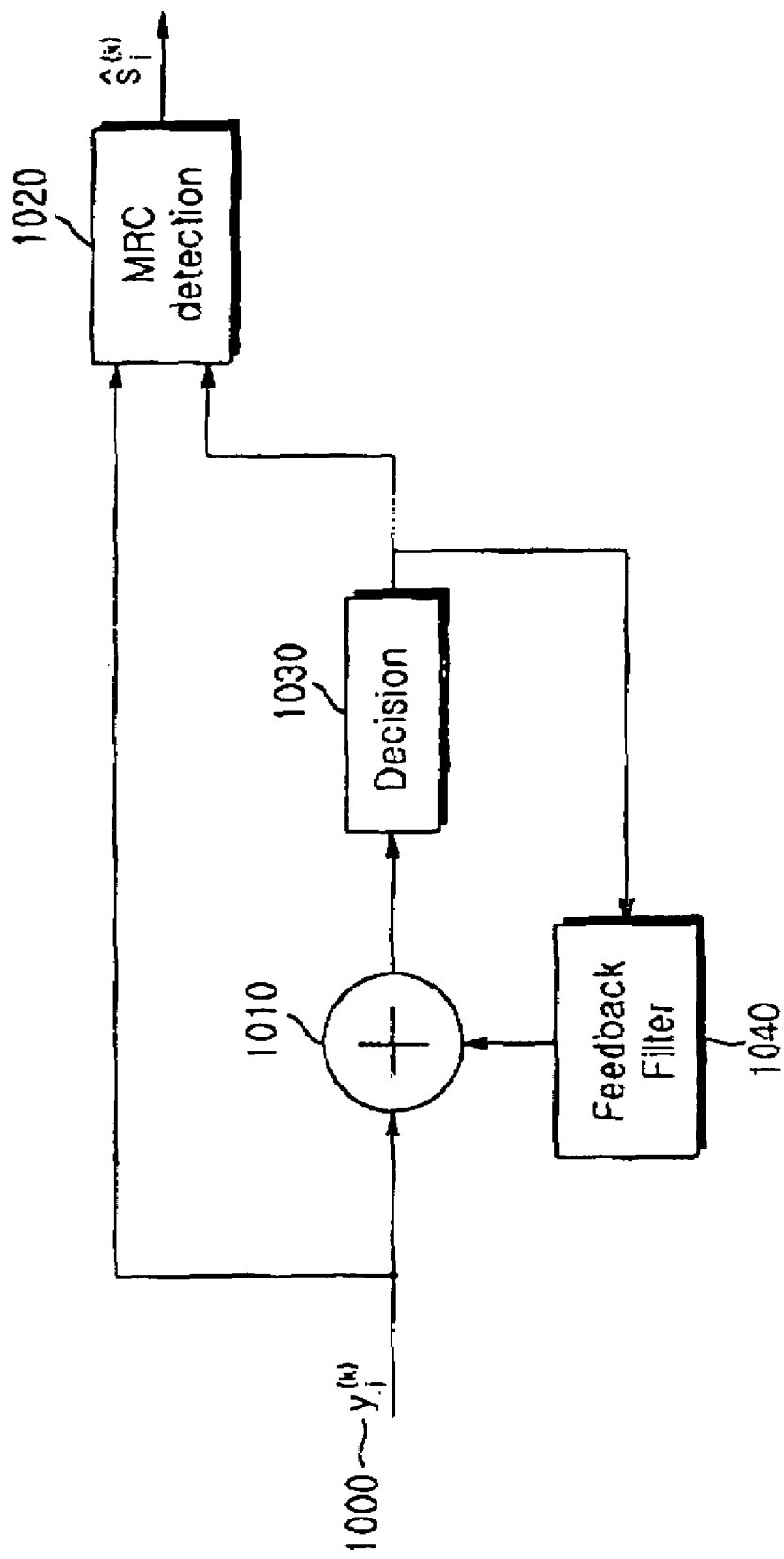
FIG. 10 is a block diagram illustrating a maximum ratio combination detector in accordance with an embodiment of the present invention.

FIG. 10 is a block diagram of a maximum ratio combination (MRC) detector in accordance with an embodiment of the present invention. In FIG. 10, an input symbol 1000 is a spread data stream in accordance with the present invention as illustrated in FIG. 4. The input symbol 1000 is input to a maximum ratio combination detector 1020 and an adder 1010. The maximum ratio combination detector 1020 determines maximum ratio combination based on the input symbol and a different input value to be described later and outputs a symbol with a particular location.

In addition, the input symbol is added to a value feedback from a previous value, that is, a value output from a feedback filter 1040, in the adder 1010, and an output of the adder 1010 is input to a decision unit 1030. The decision unit 1030 performs a hard decision or a soft decision for the output of the adder 1010. The maximum ratio combination detector 1020 outputs a symbol through maximum ratio combination of a decision value output from the decision unit and the input symbol. The above described maximum ratio combination method for canceling interference between symbols is intended for a single stage. When using multiple stages, the structure illustrated FIG. 10 is changed to a structure as illustrated FIG. 11.

Figure 11:
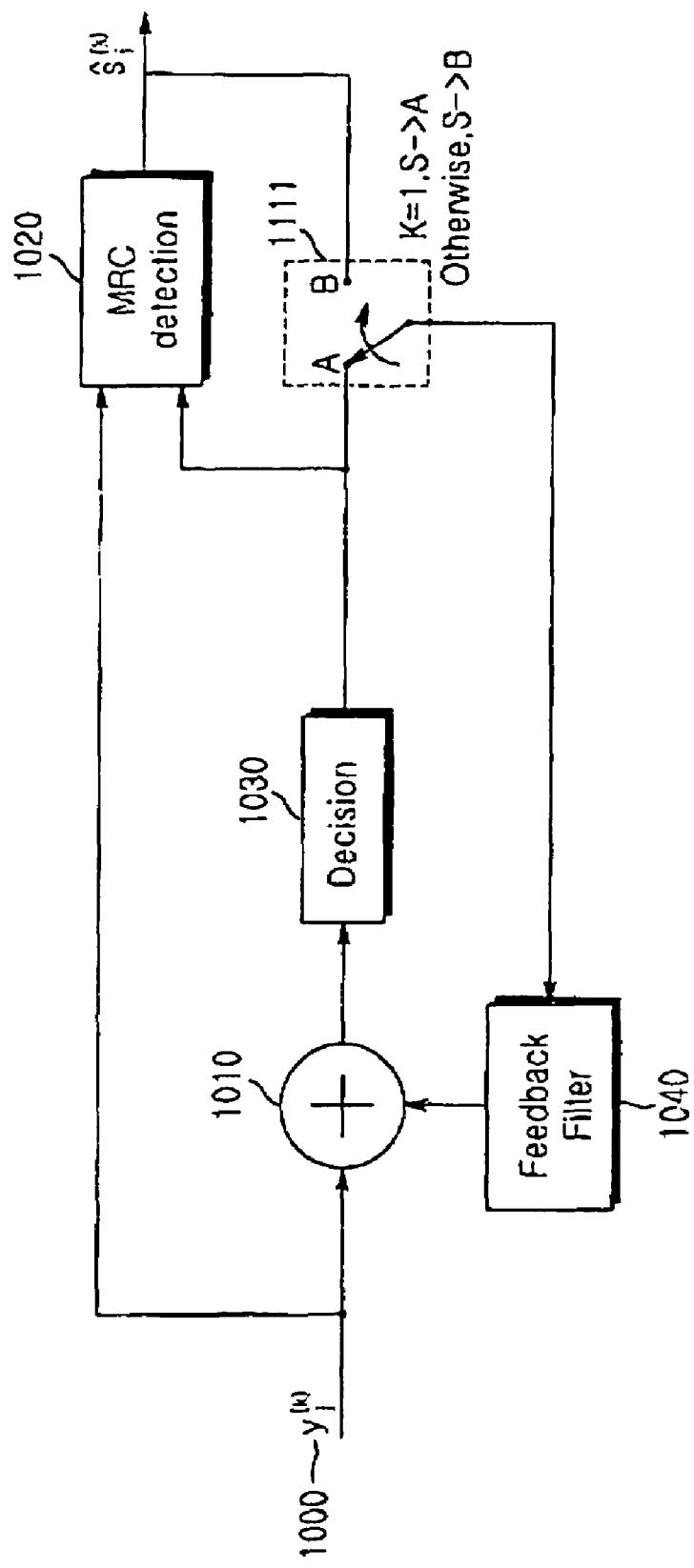
FIG. 11 is a block diagram illustrating a multi-stage maximum ratio combination detector in accordance with a preferred embodiment of the present invention.

FIG. 11 is a block diagram of a maximum ratio combination detector of multiple stages in accordance with a preferred embodiment of the present invention. The structure of FIG. 11 is the same as that of FIG. 10, except that a switch 1111 is added as a branch to an output of the decision unit 1030 in FIG. 11. The switch 1111 is provided to connect the decision unit 1020 to the feedback filter 1040 or the maximum ratio combination detector 1020 to the feedback filter 1040.

Although the maximum ratio combination detector of FIG. 10 combines energy of all symbols dispersed by multiple path channels based on a maximum ratio basis, only some of the combined energy is used to estimate ISI when the interference is cancelled. However, the structure of FIG. 10 using only some of the combined energy obstructs performance improvement of the system The structure illustrated in FIG. 11 uses an MRC detection result of a first stage in order to precisely estimate the ISI (Inter Symbol Interface) for a detection result of a second stage. The ISI detected for one symbol generally has a very high possibility of having the same effect on subsequent symbols. Therefore, by applying previous used values of symbols to a current value of a symbol, the switch 1111 is always connected to an output of the maximum ratio combination detector 1020 after a first symbol. Using this configuration, a detected value of a previous symbol is fedback to determinate the next symbol.

Figure 12:
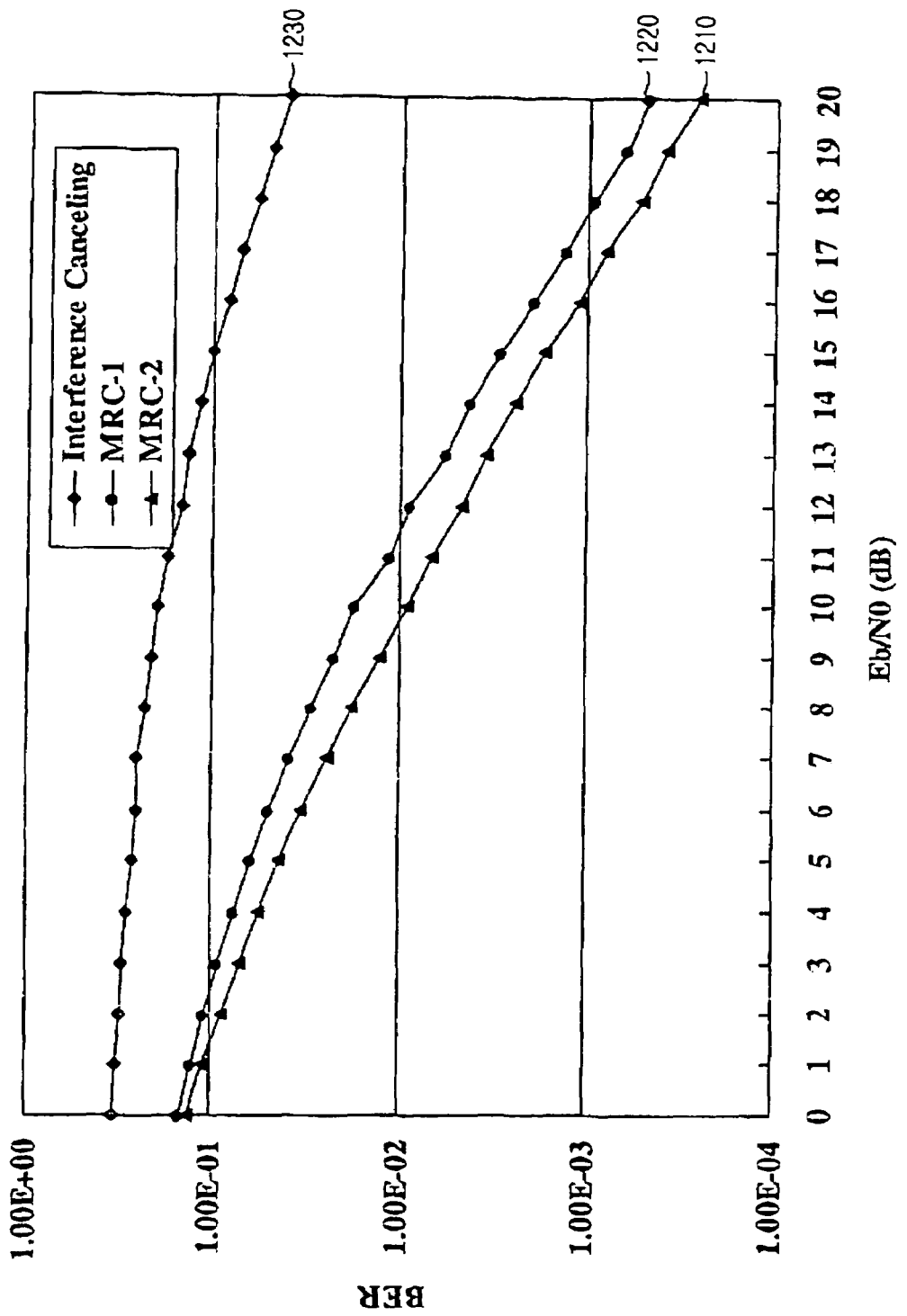
FIG. 12 is a graph illustrating a result of a simulation for a detector using one stage in accordance with the present invention, a detector using multiple stages in accordance with the present invention, and a interference removal system used in a conventional BS-CDMA.

The performance improvement of the present invention as described above and that of the conventional technique will be inspected through a simulation in the following description. FIG. 12 is a graph illustrating a result of a simulation of a detector using one stage in accordance with the present invention, a detector using multiple stages in accordance with the present invention, and an interference removal system used in the conventional BS-CDMA system.

In FIG. 12, the reference numeral 1210 designates a graph illustrating a relation between a signal-to-noise ratio and a bit error ratio when the maximum ratio combination detector with multiple stages in accordance with the present invention is used, and the reference numeral 1220 designates a graph showing a relation between a signal-to-noise ratio and a bit error ratio when the maximum ratio combination detector with a single stage in accordance with the present invention is used. In addition, the reference numeral 1230 designates a graph showing a relation between a signal-to-noise ratio and a bit error ratio in the case of the BS-CDMA system using only the interference removal system. As can be seen from the simulation graphs showing the relation between the signal-to-noise and the bit error ratio for the two detectors in accordance with the present invention and the conventional BS-CDMA system, the two detectors in accordance with the present invention show a significantly improved bit error ratio in a band required for data transmission.

Figure 6A:
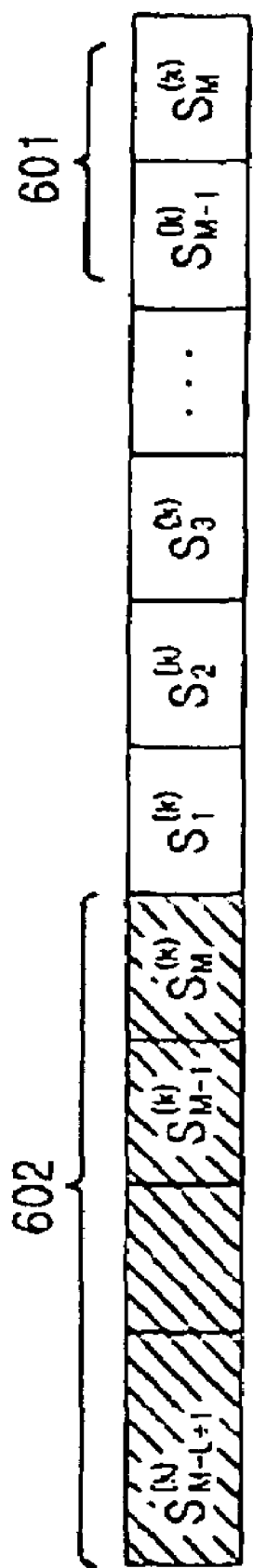
FIG. 6A is a diagram illustrating a method for constructing a data stream in order to reduce interference due to the MAI in data transmission according to the BS-CDMA system.
Figure 6B:
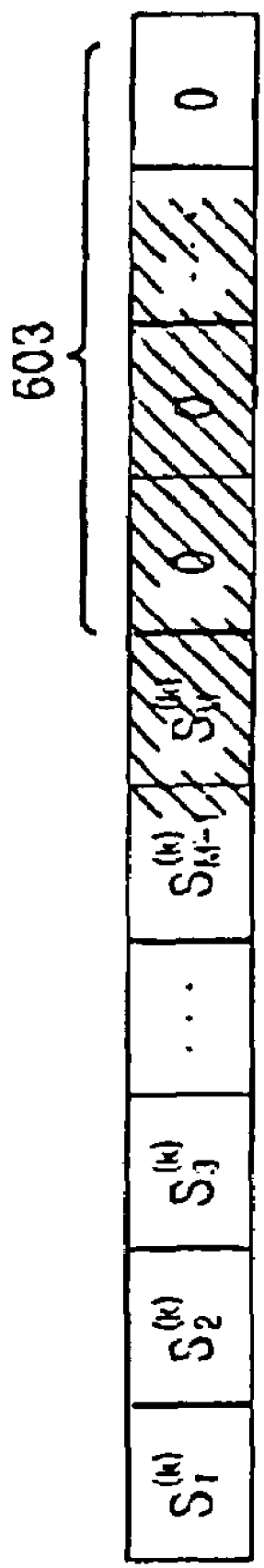
FIG. 6B is a diagram illustrating a method for constructing a data stream in order to reduce interference due to the MAI in data transmission according to the BS-CDMA system.
Figure 13:
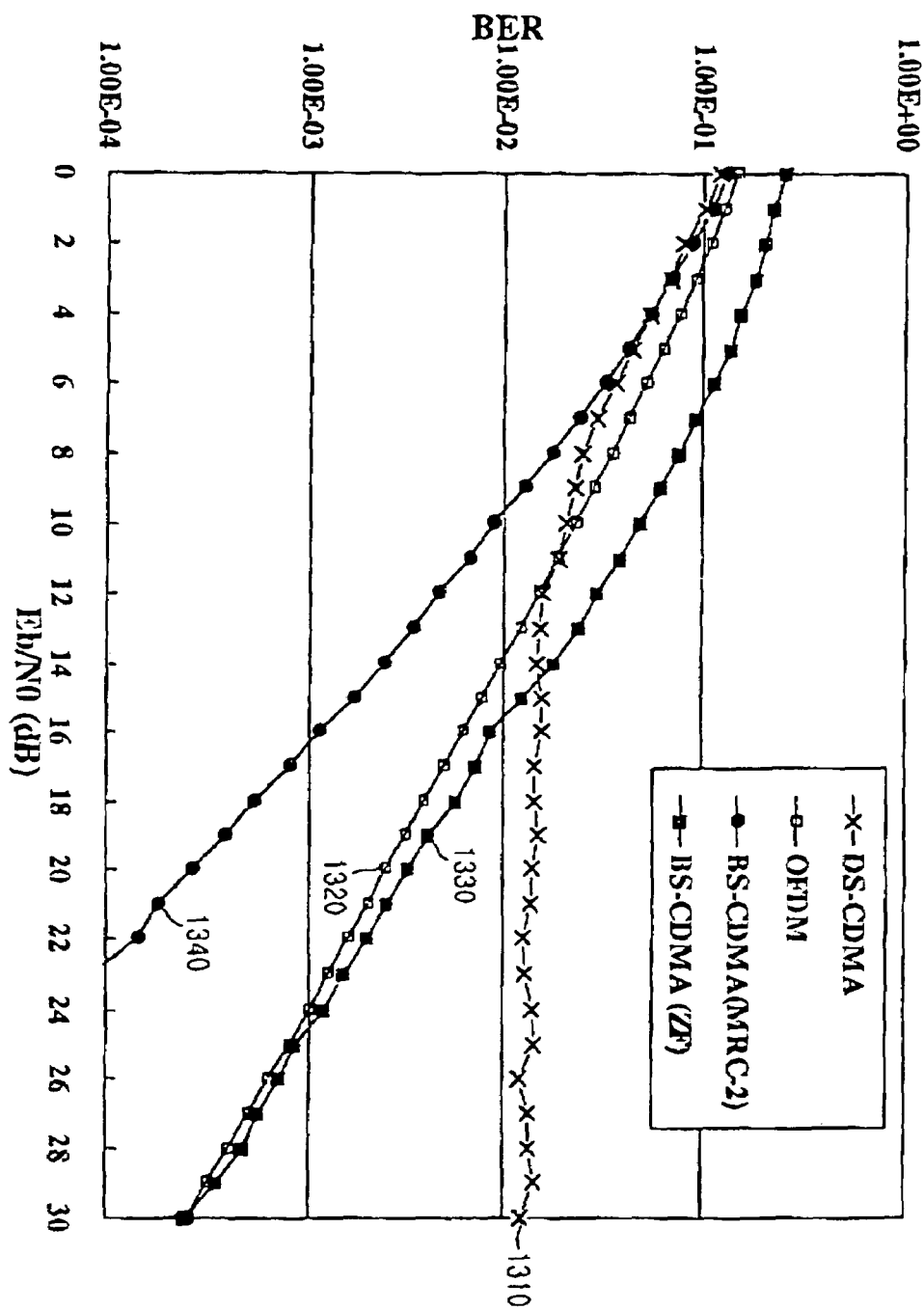
FIG. 13 is a graph illustrating a result of a simulation of the relation between a signal-to-noise ratio and a bit error ratio in various systems used in a mobile communication system.

FIG. 13 is a graph illustrating a result of a simulation of the relation between a signal-to-noise ratio and a bit error ratio in various systems used in a mobile communication system. In FIG. 13, the reference numeral 1310 designates a graph illustrating a relation between a signal-to-noise ratio and a bit error ratio in the case of the conventional DS-CDMA system. The reference numeral 1320 designates a graph illustrating a relation between a signal-to-noise ratio and a bit error ratio in the case of a conventional OFDM system in the mobile communication system, and the reference numeral 1330 designates a graph showing a relation between a signal-to-noise ratio and a bit error ratio in the case of the conventional BS-CDMA system used as shown in FIG. 6B. The reference numeral 1340 designates a graph illustrating a relation between a signal-to-noise ratio and a bit error ratio when the maximum ratio combination detector with the multiple stages in accordance with the present invention is used. As can be seen from the above graphs, the maximum ratio combination detector with the multiple stages in accordance with the present invention shows a significantly improved relation between the signal-to-noise and the bit error ratio, particularly in a band required for data transmission over other conventional methods.

As is apparent from the above description, the present invention has an advantage of receiving performance improvement of a mobile communication system using block spreading and ease of data generation.

Although preferred embodiments of the present invention have been described for illustrative purposes, those skilled in the art will appreciate that various modifications, additions, and substitutions are possible, without departing from the scope and spirit of the invention as disclosed in the accompanying claims, including the full scope of equivalents thereof.

What is claimed is:

1. An apparatus to generate a data stream in a code division multiple access mobile communication system, the apparatus comprising:
a chip spreading unit to generate a first data stream including m spread symbols by spreading n symbols using a spreading code; and
a symbol generating unit to generate a second data stream including the first data stream, a forward guard data stream and a backward guard data stream,
wherein the symbol generating unit generates the forward guard data stream by repeatedly copying a first spread symbol among m symbols by p times, generates the backward guard data stream by repeatedly copying q rear spread symbols among m spread symbols using a mirror manner, starting from a last spread symbol among m spread symbols, by r times, and each of m, n, p, q and r is an integer greater than or equal to 1.

2. The apparatus as set forth in claim 1, wherein the symbol generating unit comprises:
a latch circuit to latch and output the first spread symbol repeatedly during a first time period;
a delay circuit to delay the first data stream by a second time period identical to the first time period;
a buffer to store m spread symbols, starting from the last spread symbol among m spread symbols, and output m spread symbols using a last in first out (LIFO) manner; and
a multiplexer to generate the second data stream by multiplexing output of the latch circuit as the forward guard data stream, output of the delay circuit as the first data stream, and output of the buffer as the backward guard data stream.

3. A method to generate a data stream in a code division multiple access mobile communication system, the method comprising the steps of:
generating a first data stream including m spread symbols by spreading n symbols using a spreading code; and
generating a second data stream including the first data stream, a forward guard data stream and a backward guard data stream,
wherein the forward guard data stream is generated by repeatedly copying a first spread symbol among m symbols by p times, the backward guard data stream is generated by repeatedly copying q rear spread symbols of among m spread symbols using a mirror manner, starting from a last spread symbol among m spread symbols, by r times, and each of m, n, p, q and r is an integer greater than or equal to 1.

* * * * *